US007383150B2

(12) United States Patent
Angelini et al.

(10) Patent No.: US 7,383,150 B2
(45) Date of Patent: Jun. 3, 2008

(54) DIVING COMPUTER WITH PROGRAMMABLE DISPLAY

(75) Inventors: Sergio A. Angelini, Tennwil (CH); Jan Lichtenberg, Zürich (CH); Jari Martti Antero Tiira, Lenzburg (CH); Zivorad Antonijevic, Aarau (CH); Riku Ville Tuomas Rauhala, Wohlen (CH); Patrick André Wallimann, Apnach-Dorf (CH); Pasi Antero Lahtinen, Egliswil (CH); Thomas Hürlimann, Cham (CH); Emmanuel Glauser, St.-Légier (CH)

(73) Assignee: Johnson Outdoors Inc., Racine, WI (US)

( * ) Notice: Subject to any disclaimer, the term of this patent is extended or adjusted under 35 U.S.C. 154(b) by 0 days.

(21) Appl. No.: 11/451,042

(22) Filed: Jun. 12, 2006

(65) Prior Publication Data

US 2007/0283953 A1 Dec. 13, 2007

(51) Int. Cl.
*G01L 11/00* (2006.01)

(52) U.S. Cl. .......................... 702/139; 702/47; 702/50; 702/98; 702/138; 702/189; 73/865.1; 405/186

(58) Field of Classification Search ................ 702/139, 702/47, 50, 98, 138, 189; 73/865.1; 128/201.27, 128/204.22, 204.23; 405/186
See application file for complete search history.

(56) References Cited

U.S. PATENT DOCUMENTS 3,992,948 A 11/1976 D'Antonio et al.
4,782,338 A 11/1988 Barshinger
4,876,903 A 10/1989 Budinger
4,926,703 A 5/1990 Budinger
5,033,818 A 7/1991 Barr
5,049,864 A 9/1991 Barshinger
5,148,376 A 9/1992 Sato
5,301,668 A 4/1994 Hales
5,570,688 A 11/1996 Cochran et al.
5,617,848 A 4/1997 Cochran
5,845,235 A 12/1998 Luukkanen et al.
6,360,182 B1 3/2002 Hales
6,745,069 B2 6/2004 Nissila et al.
7,144,198 B2 * 12/2006 Hirose et al. ............... 405/186
2002/0013535 A1 1/2002 Nissila et al.
2003/0056786 A1 3/2003 Hollis
2005/0095067 A1 5/2005 Hirose et al.

* cited by examiner

*Primary Examiner*—John E. Barlow, Jr.
*Assistant Examiner*—Sujoy K Kundu
(74) *Attorney, Agent, or Firm*—Reinhart Boerner Van Deuren P.C.

(57) ABSTRACT

A diving computer is provided. The diving computer includes a computer connected to a dot matrix screen to display information concerning a dive. The computer has an interface to an external personal computer for reprogrammably configuring the information displayed on the screen. The user may customize the information on one or more views of the screen in several ways. The user may select the desired information to be displayed, and may customize the size and placement of the information on one or more views. The diving computer also has a number of pre-programmed displays that may be selected, each of which present different layouts and organizations of diving related information.

26 Claims, 8 Drawing Sheets

NO-STOP MODE

WARNING IN MIDDLE ROW TO KEEP DETAIL FIELDS VISIBLE

WARNING IN BOTTOM ROW TO KEEP NO-STOP AND DECO INFORMATION VISIBLE

MENU SELECTION

PARAMETER SETTING

DIVING COMPUTER WITH PROGRAMMABLE DISPLAY

FIELD OF THE INVENTION

This invention generally relates to diving computers, which may be in the general form of a wrist mounted instrument, part of a console connected via a high pressure hose to a diving regulator, or mounted for instance on a writing slate.

BACKGROUND OF THE INVENTION

Diving involves breathing air or other breathing gases at an elevated ambient pressure, resulting in uptake of nitrogen in the diver's body. This can have serious consequences for the diver if dealt with incorrectly. A diving computer is the best way to ensure the maximum level of safety during this activity. A diving computer may be mounted on a wrist band, or on a console that also carries other instruments. A diving computer may alternately be mounted elsewhere, as for instance on a writing slate attached to the diving vest.

Diving computers provide information regarding dive depth, dive times, and decompression schedules. This and other information is important to divers, allowing them to dive to desired depths for certain lengths of time and then ascend safely. The diving computer can display information concerning the depth and length of the dive, and can also calculate other important information, such as a decompression schedule. This information may be displayed on the screen, allowing the diver to know when his or her ascent should begin, and also informing the diver of decompression stops during the ascent. This information helps the diver prevent decompression sickness (DCS).

Divers have differing preferences as to what information should be displayed by the diving computer. For instance, some divers want only a few items of information to be prominently displayed, these few items for instance including present dive depth, bottom time, and decompression status. Other divers want more items of information, and do not mind if the individual items displayed are smaller in size. These items may include the above-mentioned items, and also a maximum depth, a water temperature, a central nervous system oxygen toxicity reading, and a partial pressure of oxygen.

Typically all of this information is arranged in an LCD display with predefined "segments." The segments define what information can be displayed and where. Some areas of the display can show more than one parameter, be it by pressing a button on the computer or via pre-programming. Since dive computers often have "surface functions" also, such as logbook, dive planner and more, there is also the need to display menus, symbols and other information pertaining to the surface functions. This can quickly fill up the available area of the display. As a result, the area available for display of pertinent dive information is reduced and consequently the information itself is small and may lead to a confusing display.

The prior art provides diving computers with only limited ways of displaying of information. For instance, U.S. Pat. No. 5,617,848 discloses a diving computer that measures external parameters, such as external pressure, a breathing tank pressure, and salinity of the water, and then displays this information. There is no disclosure of customizing the display of information. In another example, U.S. Pat. No. 5,845,235 discloses a diving computer that allows a user to program the diving computer to display one or more desired items of information, along with an additional portion of the display for displaying permanently selected items. There is no disclosure of further customizing the display.

U.S. Pat. Appl. Publ. 2005/0095067 discloses a more advanced display of information, including several dive parameters. However, the resulting screen is very crowded with items of information, and two screens are required to display all the information needed by the diver. What is needed is a better diving computer in which information desired by a diver may be seen on a single screen. These and other advantages of the invention, as well as additional inventive features, will be apparent from the description of the invention provided herein.

BRIEF SUMMARY OF THE INVENTION

In view of the above, the present invention provides a new and improved dive computer having a user programmable display. Instead of LCD displays with predefined segments, one embodiment of the present invention uses of a dot matrix display, in which the segments are basically all small and square, and fill the entirety of the viewable display. By combining many of the small squares in a variety of ways, one can obtain any number of shapes, symbols, letters and number. Thus such display can show information analogous to that of a segment-type LCD but with more freedom of shape, size and position and without the limitation of having to predefine all the symbols that can be shown.

In a further embodiment, the system combines the dot matrix display with an interface that allows the end user to select which information to show, where to show it and how big to show it. The user can also select which alternative information should be shown, where and in what size, upon pressing buttons.

Preferably, the computer is pre-programmed with certain settings which resemble the look of the computers currently manufactured by the assignee of the instant application. Upon establishing a communication between the dive computer and a PC (via infrared, BLUETOOTH, cables or other means), the user can change the layout of the display. Alternatively or additionally, the system also allows for changing the layout directly on the dive computer by providing the necessary functionality in the dive-computer firmware.

The computer or PC interface is provided through dedicated interface software. The user is shown an empty screen corresponding to the display of the computer. To the side, there are four menus from which to pick the parameters to be displayed. The four menus correspond to four groups of dive information as will be described more fully below.

One by one, the user selects and then "drags" the parameter of interest over to the screen, "drops" them into place and the adjusts the size by "pulling" on one of the corners of the rectangle. All parameters contained in certain groups must be dropped onto the display otherwise the changes will not take effect. This is necessary so as to ensure that the user does not inadvertently forget to display important information on the computer during the dive. Items in other groups can be carried over selectively, either as permanently shown or as alternate displays (e.g., obtained by pressing a mechanical button).

Other embodiments and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. The drawings are meant to be illustrative rather than limiting. In the drawings.

Figure 1:
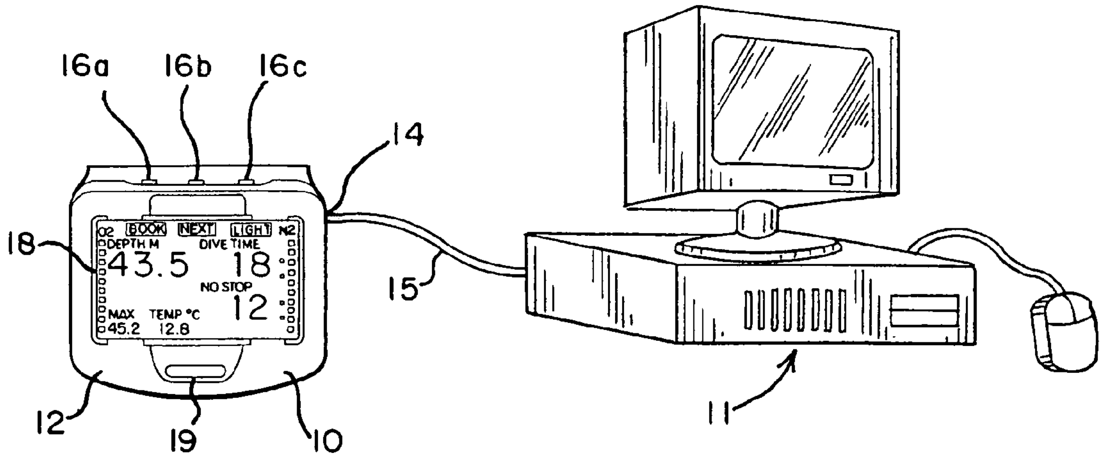
FIG. 1 depicts a diving computer and a separate computer workstation.

While the invention will be described in connection with certain preferred embodiments, there is no intent to limit it to those embodiments. The intent is to cover all alternatives, modifications and equivalents as included within the spirit and scope of the invention as defined by the appended claims.

DETAILED DESCRIPTION OF THE PRESENTLY PREFERRED EMBODIMENTS

As discussed above, diving computers typically display a multitude of parameters relative to the dive. These can be divided into four groups: 1) those that are very important for the diver to see throughout the dive, 2) those that are maybe interesting but not important, 3) primary warnings and alarms which alert the diver of very dangerous situations and 4) secondary warnings and alarms which alert the diver in special but not dangerous circumstances.

In the first group, which contains the information paramount to diver safety, there are, for instance, instantaneous depth, bottom time and decompression status (either in form of no-stop time or of decompression stops and related total ascent time). This group contains the "must have" information ("MH"). In the second group, which contains information that is relevant to the dive but not necessary for the diver to know, there are, among others, water temperature, maximum depth, set oxygen mixture for nitrox calculations, CNS O2 (oxygen) clock, partial pressure of oxygen, time of day, date. Graphical representation of nitrogen loading or oxygen loading are also included in group 2 since this is also "nice to have" information ("NTH"). In the third group, which contains alarms that are necessary for diver safety, there are ascent rate alarm, missed decompression alarm, oxygen toxicity alarm and others. These alarms are referred to as "primary alarms" ("PA") In the fourth group, which contains alarms that alert the diver of special but not dangerous situations, there are, for instance, maximum depth alarm, elapsed time alarm to name a few. These alarms are referred to as "secondary alarms" ("SA").

In case of gas-integrated computers, among the information belonging to group 1 there is tank pressure and remaining bottom time based on gas consumption. Similarly, there will be a low gas pressure warning and possibly an increased exertion warning among group 3. In group 4 there could be a mid tank warning message.

The information in group 1 must be shown at all times, be clear to understand and in a position and of size such that it is intuitively and easily understood. Information in group 2 can be shown smaller, and in less prominent positioning of the displays, in an alternating mode with a second field from group 2, or maybe not at all. The primary alarms, group 3, are only shown when a situation arises that triggers the alarm itself. When this is the case, the alarms show prominently on the screen and in an intuitive and easy to read position, and are of a size that is easily distinguishable. Secondary alarms do not need to be shown prominently, or at all.

With these parameters in mind, a diving computer according to the present application is depicted in FIG. 1. The diving computer 10 includes a waterproof housing 12 and an interface 14 to a personal computer 11. Interface 14 may link diving computer 10 to the personal computer through cable 15. Interface 14 may be a protected connector used to physically connect the diving computer to the personal computer. Alternatively, the link may be wireless, such as an infrared link (line of sight), BLUETOOTH or a radio-frequency (RF) antenna. The diving computer includes control buttons 16*a*, 16*b*, and 16*c*, a screen 18, and a pressure sensor interface 19, which may be positioned in one embodiment underneath the lower case of the housing 12. The general form of housing 12 is suitable for mounting on a wrist band.

Alternatively, the diving computer or the display may be mounted on another portion of a diving suit. For instance, SCUBA diving masks that incorporate a display may be used, or the diving computer and display may be attached to a sleeve or other portion of a diving suit. The screen must be available so that the diver can receive and act on information from the diving computer and the display during the dive. The control buttons or control interfaces on the diving computer should also be available to the diver, so that the diver may call for different information on different screens using the control buttons during the dive. In this example, the diving computer has three control buttons 16*a*, 16*b*, 16*c*, for the diver to control the diving computer as will be discussed more fully below.

Figure 2:
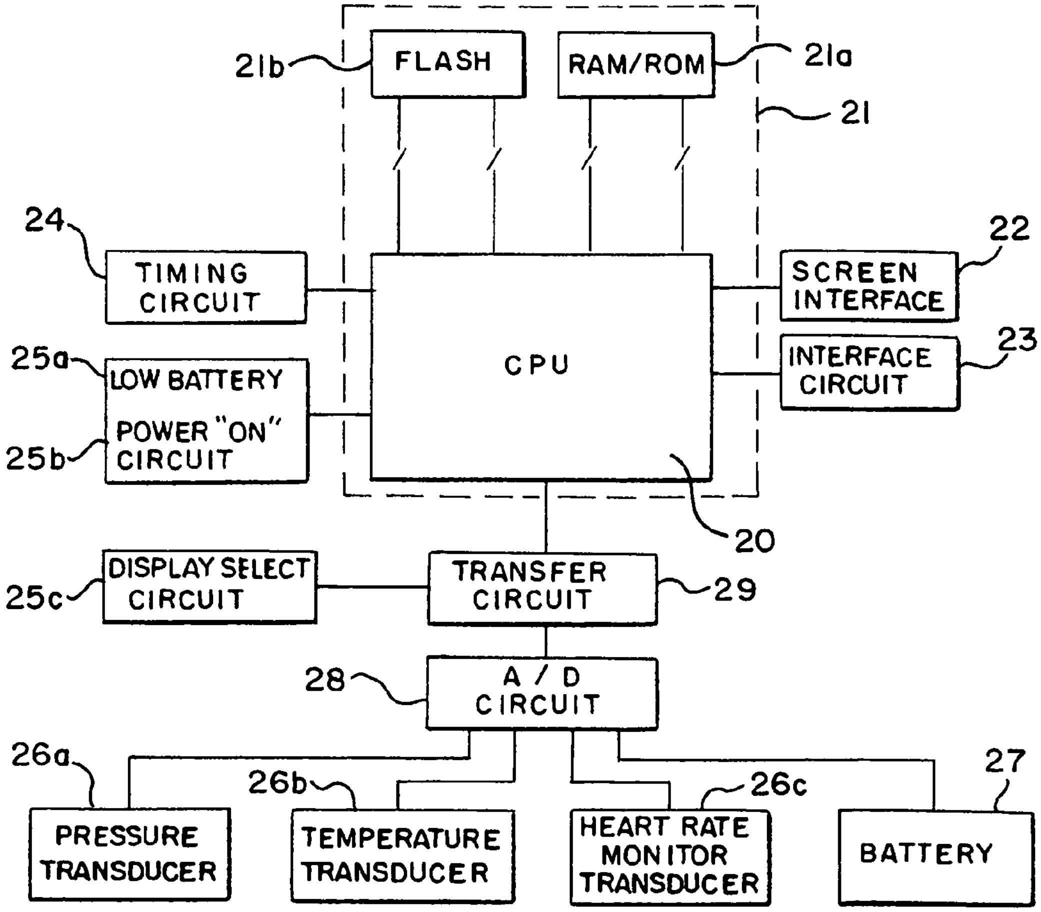
FIG. 2 is a schematic view of one embodiment of circuitry for the diving computer of claim 1.

The diving computer includes a digital computer that controls the diving computer, along with circuitry for controlling the functions, inputs, and outputs of the diving computer. One exemplary embodiment is depicted in FIG. 2. Digital computer 20 may be a microprocessor or other central processing unit (CPU). The digital computer desirably includes at least one memory 21*a*, including read-only memory (ROM) for permanently storing computer software programs used to operate the diving computer, and also preferably including random access memory (RAM), which may be used for storing diving data. One embodiment includes flash memory 21*b*, such as an EPROM, for updating or reprogramming the computer programs used to operate the diving computer. There is a screen interface 22 for interfacing to a screen for displaying the desired items of information on the screen. The digital computer also preferably includes a circuit for an external interface 23, such as one used for programming or reprogramming the diving computer, and an oscillator or timing circuit 24.

Other components of the diving computer also are generally concerned with inputs and outputs, and interfaces for the inputs and outputs. Circuits 25*a*, 25*b* may be circuits for detecting and indicating "low battery" and "power on" outputs. The diving computer may also include a display select circuit 25*c* that allows the user to select from one or more outputs during a dive. There may also be a battery 27, an analog to digital (A/D) converter circuit 28 and an additional interface or transfer or interface circuit 29 for converting the outputs of the A/D circuit for the microprocessor. The inputs may include one or more pressure transducers 26*a*, a temperature transducer 26*b*, and an additional transducer 26*c*, which may be a heart-rate monitor transducer or other desired input.

As noted, each additional input, such as the heart rate monitor, requires a suitable transducer or receiver for receiving the input. The heart rate monitor for the diver may be equipped with a radio-frequency (RF) output and the diving computer may be equipped with an RF transducer for receiving the output of the heart rate monitor. For example, BLUETOOTH low power radio frequency circuits may be used for sending and receiving such transmissions over a very short distance. The heart rate signal may then be modified as needed for recording and may be used by CPU 20 for display on one of the pre-programmed displays, or may be used in calculations for the dive. For instance, merely displaying the heart rate may convey information to the diver as to whether he or she should slow down or relax more.

Another input may include a tank pressure signal. Using this signal, the diving computer can calculate a breathing gas consumption and correspondingly derive a maximum time for remaining underwater. It can also extrapolate an exertion level by the diver (based on an increase in breathing rate) and if the decompression algorithm is suited for it, adapt the decompression schedule accordingly. If the diving computer is equipped with a temperature transducer, the diving computer can receive a temperature input from a remote temperature element, such as a thermocouple or thermistor, or from a local hard-wired temperature element. The computer can then be programmed to display the surrounding temperature, such as a water temperature. Other interfaces may also be used to accept other desired inputs and to calculate other outputs.

As is well known to those skilled in designing and using diving computers, there are a number of computer software programs, i.e., algorithms, that are used for the computations involved in a diving computer. For example, a number of such programs are used to receive inputs and then to calculate diving safety parameters. A diving safety parameter is a variable associated with personal safety for a diver on a dive. Diving safety parameters include, but are not limited to, a time of a dive, a depth of a dive, a series of times and depths of a dive, a maximum depth, an estimated or actual partial pressure of oxygen, an actual or calculated oxygen toxicity, and a decompression status. These parameters may include the time a diver may remain at a given depth without the need for a decompression stop during the subsequent ascent. The program may also calculate the stops (depth) and time required during ascent if one or more decompression stops are required. Decompression algorithms may include, but are not limited to, the bulk-diffusion model, the thermodynamic model, Buhlmann's algorithm, the multi-tissue model, the varying-permeability model, the reduced-gradient bubble model, and the tissue bubble diffusion model.

Returning to FIG. 1, the diving computer includes a screen 18 for displaying information to the diver. The screen is preferably a dot matrix screen, which may be programmed to display selected items of information in a selected portion of the screen. However, other embodiments of the diving computer are not limited to dot matrix screens. Any screen may be used in which it is possible to customize the size and location of items of information for display. The screen itself may be equipped with an interface, such as an RS232, and a volatile or non-volatile storage component, such as SRAM or Flash, so that it may easily be reprogrammed for different displays of different sizes.

The personal computer 11 may be used to program the diving computer 10 using one or more of the decompression algorithms. In one embodiment, when using the diving computer, a user may select from a conservative or a liberal algorithm for following a decompression schedule. A conservative algorithm is one that allows less time or depth on a dive, while a liberal algorithm typically allows for more time or depth on the same dive. The diving computer may also use additional inputs to calculate the decompression schedule. For instance, if the diving computer has an interface to a source of air or Nitrox, such as a pressure transducer, the diving computer can calculate the decompression schedule including the tank pressure as an input to evalulate the exertion level of the diver and adapting the decompression accordingly. In addition, from the tank pressure the computer can evaluate a maximum time that the diver may remain on the dive, compare it to the time needed to decompress, and alert the diver if the tank supply is not sufficient for the intended decompression.

The personal computer 11 may also be used to program the options or the displays available to the diver. The personal computer 11 may include an application programming interface (API), such as one depicted in FIG. 21. This particular API may serve as a template for alternate easy-to-program interfaces. The user may select a ready made configuration and modify it or start from scratch to build the display on the dive computer.

Figure 4:
FIG. 4 is a top view of a second display of a diving computer.
Figure 5:
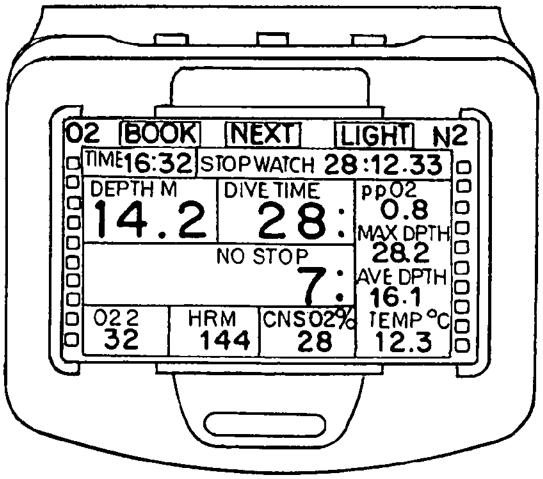
FIG. 5 is a top view of a third display of a diving computer.

In one embodiment, the pre-configured screen layouts include a "classic" configuration (see, e.g. FIG. 3), a "light" configuration (see, e.g. FIG. 4) and a "full" configuration (see, e.g. FIG. 5). The classic configuration is set as a default display in one embodiment, and shows all standard information needed during the dive in a lay-out similar to that of the assignee's current products (showing one or two of the items in group 2). The light configuration maximizes the size of the displayed data by focusing on only the absolutely necessary information (i.e. not showing any of the items in group 2). The full configuration displays all the information that the dive computer is capable of displaying (i.e. showing all the items in group 2).

To begin programming the layout of the display in order to make user-configured screen layouts, the user has to select first the group 1 items ("must have" items) and the group 3 items (primary alarms) in the API from area 200. In this area, the user will then select an element from the list of required elements 218. Then the user selects the size/style of the element from selection 219. The selected symbol is shown in symbol box 210. From there the user can move it to the edit window 213. After all the mandatory elements (MH and PA) are correctly located in the main page the user can continue to the next phase and add elements from group 2 and group 4.

The elements to be placed on the display are rectangles with an example inside (for example FIG. 88.8 and the text "DEPTH" in small font above it). Once located on the display, they will have tool-tips (hint texts), which tell the name, size and category of the symbol, when the user moves the mouse over it.

After the main page is completed the user can assign buttons from area 211 and select the action to be taken for the button in area 212. If the user chooses "Alternate display" the user can add sub pages for the button by selecting the appropriate key in area 217. To populate these sub pages, the user can select items of information that are either already included in other display pages or from the menu of currently unused items of information. For example, the user can have the main display or one of the sub displays displayed in window 215. By using the keys in area 214, the user can add an item that is already included in one of the other displays. The selected item from the other display (shown in window 215) is then copied to the edit window 213 and may, in one embodiment, be positioned and sized as discussed above. In an alternate embodiment, the sizes and locations of the copied items of information will be the same as in the original page from which they were copied and they can not be altered. Alternatively or additionally, the user can select some of the not yet used elements from the "nice to have" (NTH) and "secondary alarms" (SA) pages by selecting the appropriate tab in area 200.

The button "Add mandatory items" in area 214 will add all MH and PA elements on the page being edited. The "timeout" in section 217 is on as a default and the user cannot switch it off unless all the mandatory items are located on the sub page. The user can use "<" and ">" buttons in area 217 to scroll back and forth through the various sub pages and edit the active page.

The surface display is built the same way as the sub pages discussed above except that it does not have mandatory items and the button actions are fixed. The surface display and related sub pages are independent of the dive displays and can be created and saved separately.

When the programmer has finished the page designs, the page may then be added to the memory of the diving computer. As noted above, the diving computer may be equipped with a reprogrammable memory, such as an EPROM or flash memory, for this purpose.

Figure 22:
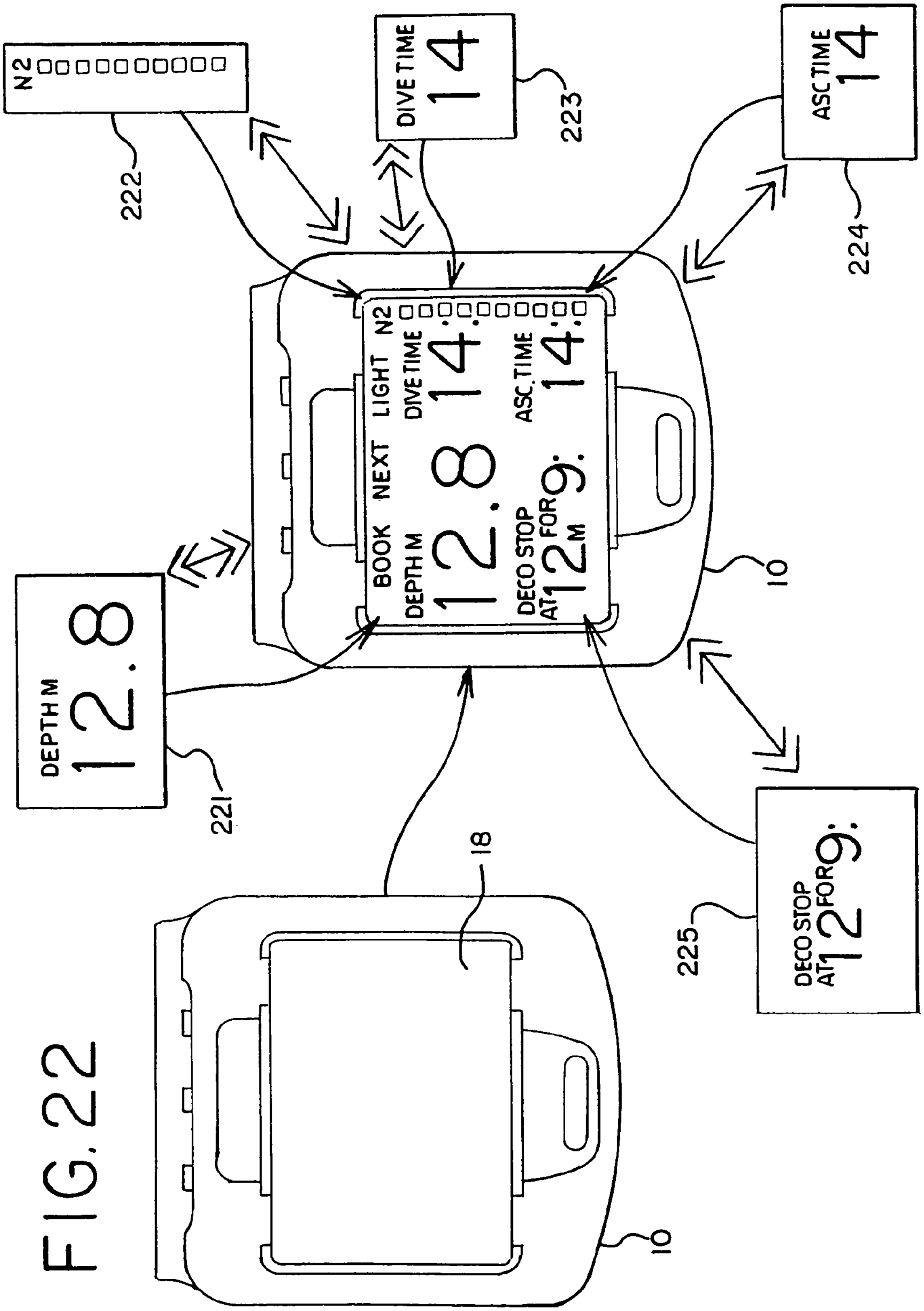
FIG. 22 depicts a process of selecting content, sizes and placement of information on a diving computer.

In an alternate embodiment of the present invention, an application programming interface that allows "drag and drop" construction of the various display screens of the diving computer is used with an external programming computer. This embodiment has similar parameters as the previously described embodiment with regard to utilization of all of the items of information from certain groups. Once the items for display are selected, the programming is completed for each display by selecting a size and a location for each item on the display. As depicted in FIG. 22, each display for screen 18 of diving computer 10 is designed by using the drag and drop method. In this example for a basic decompression mode display, a depth display 221 is placed in the upper left of the screen for the best visibility, and the programmer sizes the display as desired using the corner size indicators. A nitrogen saturation bar graph 222 is sized as desired and is located on the right margin of the screen. A dive time indicator 223 is located between depth reading 221 and bar graph 222. A decompression stop 225 is located on the left bottom portion of the display, and an ascent time 224 is sized and placed to the right of the decompression stop time 225.

The programmer may then proceed to program in each main and alternate display using this basic "drag and drop" technique. Other programming techniques may also be used, such as selecting a pixel resolution or an available area or portion of a display, or both. No particular technique is required. In one alternative, a user may select a default mode, such as equal space or resolution for each selected item of information. After the default mode is displayed, the user may adjust one or more items of information as desired and finalize the particular display. FIGS. 3-18 depict particular displays of information that may be useful to a diver. The control buttons or user interfaces of the diving computer, 16*a*, 16*b*, 16*c*, allow a user to toggle through a number of alternative displays.

In one embodiment, touching the three buttons for a moment will bring up the menu, log, and light functions. In the same embodiment, or in another embodiment, the holding the menu button will allow the digital computer to access a digital compass display, if the diving computer is equipped with such a compass that is interfaced to the diving computer. Pressing and holding the log button will allow a user to jump directly to another viewing function, such as a picture viewing menu or to an emergency message prestored in the dive computer in case of a diving accident. Pressing and holding the light button will allow the diving computer to go directly to an oxygen concentration function. In the oxygen concentration function, the diving computer may display a current oxygen concentration, and may also display a maximum operating depth (MOD), and the partial pressure of oxygen used to calculate the maximum operating depth.

Figure 10:
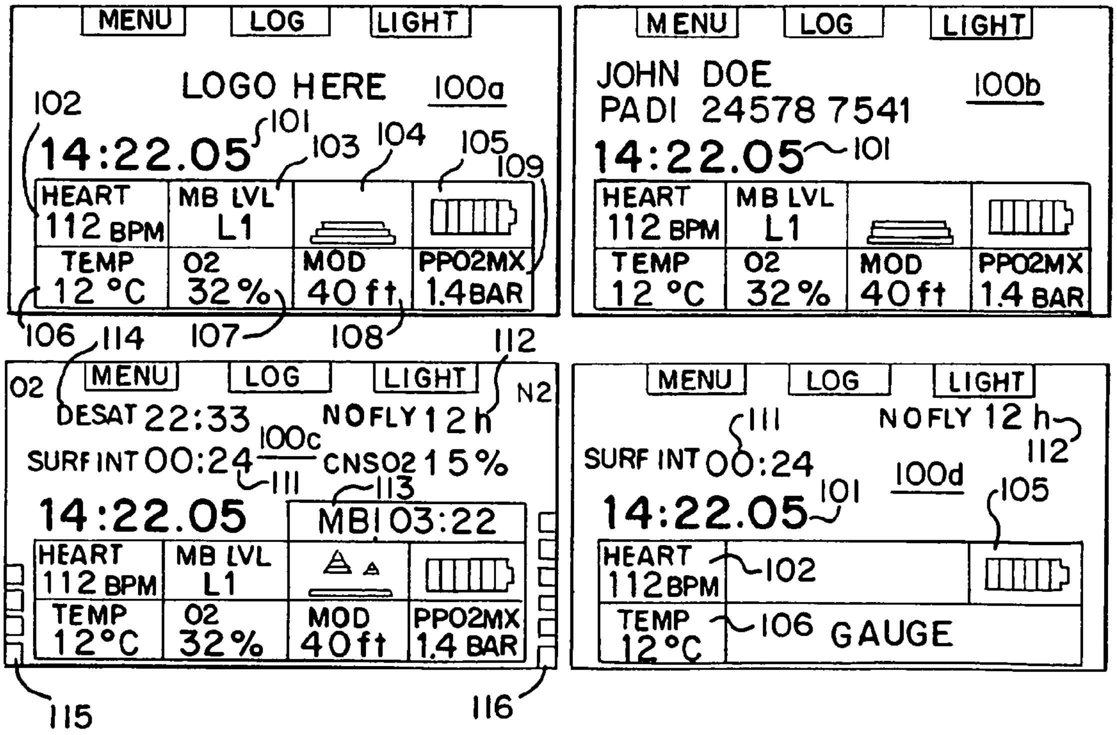
FIG. 10 includes four alternate views of surface displays.

In one embodiment, a diving computer has three control buttons for a user to manipulate. The buttons may be labeled, as seen in FIG. 10, menu, log, and light. The menu button may be used to scroll through the entire menu of functions and settings that have been programmed into the diving computer. The log button may be used to direct the display to a logbook menu. In one embodiment, the diving computer has recorded parameters of one or more previous dives. While on the surface the log function allows the user to look up information about previous dives. The third function, light, may be used to turn on a backlight for the display screen.

Figure 3:
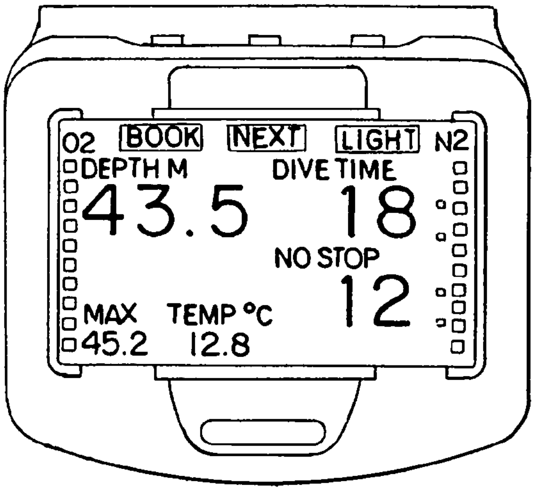
FIG. 3 is a top view of a first display of a diving computer.

The display of FIG. 3, in a no decompression mode for the "classic" preconfigured display, includes a present depth of the user, a remaining dive time, a time remaining for a no-stop ascent, and a nitrogen saturation bar graph. The display also includes the maximum depth on this dive as well as the present water temperature. In this preconfigured display, about the same display size is used for the three most important numerical readings, the present depth and the two times mentioned above. The maximum depth and the water temperature items have a smaller size in the display. The diving computer will use the selected decompression algorithm to compute decompression times and depths if the diver exceeds the no decompression stop time at a particular depths or depths. In this embodiment, during the dive the buttons change labels to (from left to right) BOOK, NEXT and LIGHT. Pressing the BOOK button sets a bookmark in the logged dive profile. Pressing the NEXT button allows the user to scroll down a list of alternative displays that were selected (or are defined in the preconfigured menu). One possible series is a maximum depth, an oxygen concentration, a heart rate, a time of day, an active conservatism level in the algorithm, a central nervous system oxygen toxicity, and an average depth. Other embodiments may select different information or a different number of displays for a user to select from.

FIG. 4 depicts a display on the screen for the "light" preconfigured display for a no decompression stop mode, or a "no-stop" mode. This is the same mode as is illustrated in FIG. 3, discussed above, so that the differences in these preconfigured displays may be observed. In this mode, the diver intends to limit the time underwater to that time and depth in which no decompression is required. In this mode, the diving computer displays the present depth and the remaining dive time. The large "99" indicates the minutes remaining in no-stop mode at the current depth. The buttons may have the same functions described for FIG. 3 above.

FIG. 5 depicts a display in the "full" preconfigured display. In this display, the diving computer displays an oxygen level and a decompression graph on the left and right hand sides of the screen. In addition, the numerous other parameters, from the time of day, to the time elapsed for the current dive, to the water temperature are also displayed. Thus, embodiments may include a small number of important items of information, as depicted in FIGS. 3-4, or they may include a larger number of items of information, as depicted in FIG. 5. In this instance, the bar graph indicates graphically what the CNS O2 (Oxygen toxicity) level is. A central nervous system oxygen toxicity level is also shown in the display near the bottom of the screen, and also in the bar graph at the left side of the screen. The oxygen level is toxic to the human body when the relative level has risen to 100% (of the level deemed to be toxic).

Figure 6:
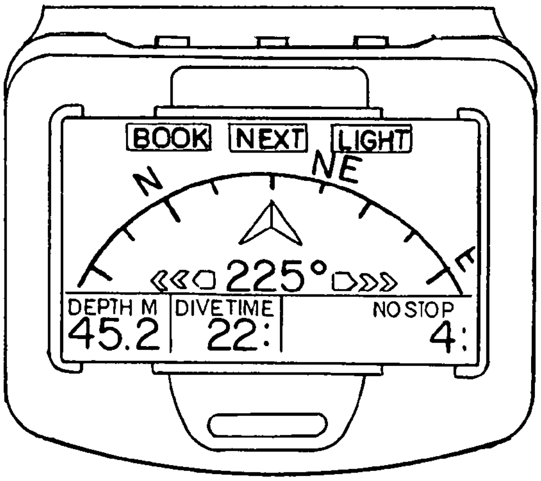
FIG. 6 is a top view of a compass display of a diving computer.

FIG. 6 depicts another display in which a digital compass with a graphic representation and a numeric bearing (225°) use almost all the available room on the screen. This display allows a diver to gain his bearings and stay on a predetermined course, and still have access to his or her present depth, the time elapsed on the dive, and the time remaining for a no-stop ascent. In the embodiments of FIG. 6, the three control buttons are now labeled, "BOOK," "SET," and "LIGHT." The button labeled, "SET," allows the user to set a reference bearing in the compass.

Figure 7:
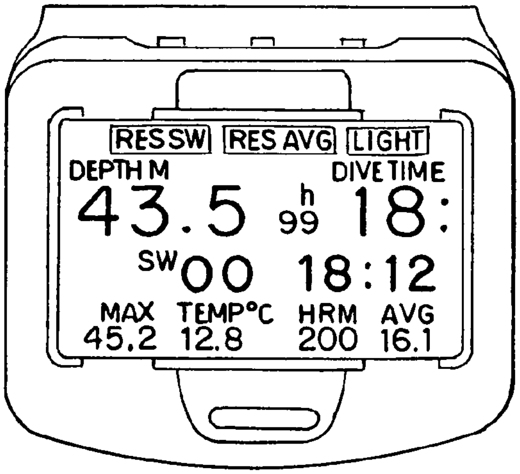
FIG. 7 is a top view of a gauge mode display of a diving computer.

The diving computer may also be used in a gauge mode, as depicted in FIG. 7. Note the small "99," in the middle of the display, indicating the maximum run time of 99 hours (and 59 minutes). In this display, the three buttons are labeled for resetting the stopwatch ("RES SW"), resetting the continuously updated average depth of the dive ("RES AVG"), and, again, activating the backlight for the screen. The stopwatch may be used to time the dive, and the average depth may be used by technical divers to evaluate their decompression schedules using trimix or other mixed gases. In this embodiment, the diving computer also has sufficient interfaces so that it is displaying a temperature of the water (Temp ° C.) and a heart rate from a heart rate monitor (HRM).

Figure 8:
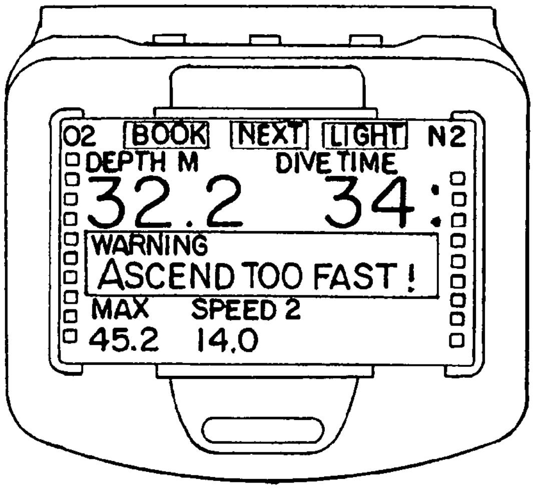
FIGS. 8-9 are views of alarm displays of a diving computer.
Figure 9:
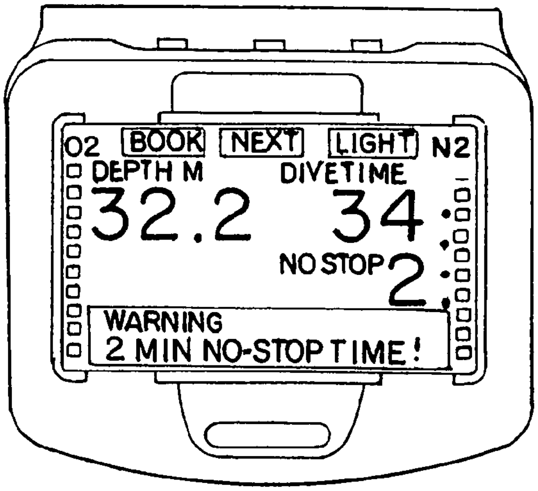

As part of the programming of the diving computer, alarms may be programmed to interrupt the displays for warnings or cautions, as depicted in FIGS. 8-9. In the display of FIG. 8, a diver has exceeded his or her rate of ascent and may be in danger of decompression sickness (DCS) or arterial gas embolism (AGE). Accordingly, a warning has interrupted the display. Depending on the extent in time and magnitude of the excessive ascent rate, the diving computer may calculate an adjusted decompression schedule for the user to follow. In FIG. 9, the user has programmed in a 2-minute warning so that he or she is alerted when only two minutes remain for allowing a no-stop ascent.

In addition to the diving displays discussed, the diving computer may also have displays that are useful when the diving computer is not being used in a diving mode. For instance, FIG. 10 depicts several screens that may be useful when the user is on the surface, such as in a boat or onshore. The display can show the manufacturers logo or the owner may program in his or her name, as well as other useful parameters such as the dive certification number or dive insurance number. In displays 100*a* and 100*b*, the displays include a heartbeat 102, an active conservatism level in the decompression algorithm 103, a stylized mountain display 104 to describe current and prohibited altitudes, a battery life icon 105, a present temperature 106, the oxygen concentration used for the dive 107, the related maximum operating depth 108, and the set maximum allowed partial pressure of oxygen 109.

Display 110*c* has similar parameters, but depicts a display after a dive when the diver has remaining saturation (residual nitrogen). That is, the diver's body still contains dissolved nitrogen that needs to be accounted for in case of performing another dive. It also could cause decompression sickness if the diver were go to an environment of reduced ambient pressure, such as a higher altitude, or flying in a commercial plane. Display 100*c* displays the calculated remaining desaturation time 114 of 22 hours and 33 minutes, and an indicated no-fly time 112 of 12 hours. The computer displays the interval of time on the surface since the last dive 111 of 24 minutes. The bar graphs on the left and right sides of the display CNS oxygen toxicity 115 (left side, also shown numerically as 15%,), and residual nitrogen loading 116 (right side). The gray bars of the stylized mountain icon 104 depict prohibited altitudes (altitudes the diver should not reach given the current nitrogen loading). In gauge mode, the surface display changes as depicted in FIG. 10 at 100*d*. Here includes only a time of day 101, a heartbeat rate 102, a battery life indicator 105, a temperature reading 106, a surface interval 111 since the last dive, and a time remaining 112 during which flying is prohibited.

Figure 11:
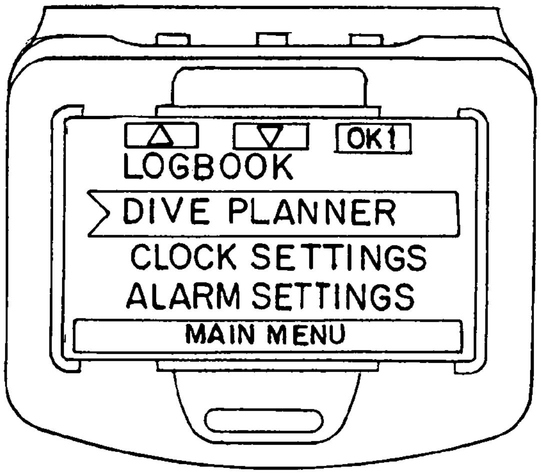
FIGS. 11-12 are top views of a display of a diving computer for use during menu selection and parameter setting of the dive displays.
Figure 12:
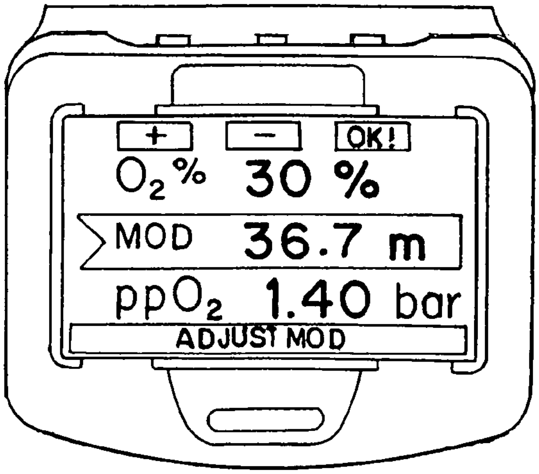

FIG. 11 shows the menu display, obtained by pressing the menu button from the surface display. From here the user can scroll through the list of available menus, and select the desired one by pressing the ENTER button. One of the menus is the oxygen concentration setting (for Nitrox diving) shown in FIG. 12. Here the diver can set the oxygen concentration has contained in his scuba tank, then view the corresponding maximum operating depth (MOD) based on the set partial pressure of oxygen (ppO2).

Figure 13:
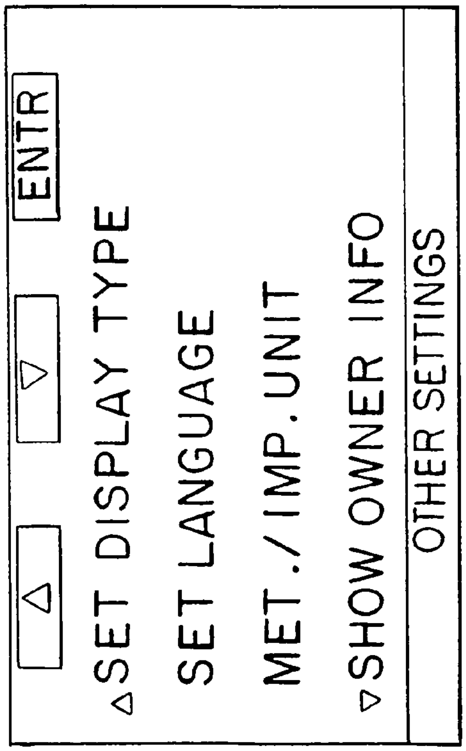
FIGS. 13-16 are views of alternate possible screens of a diving computer during programming of the diving computer.
Figure 14:
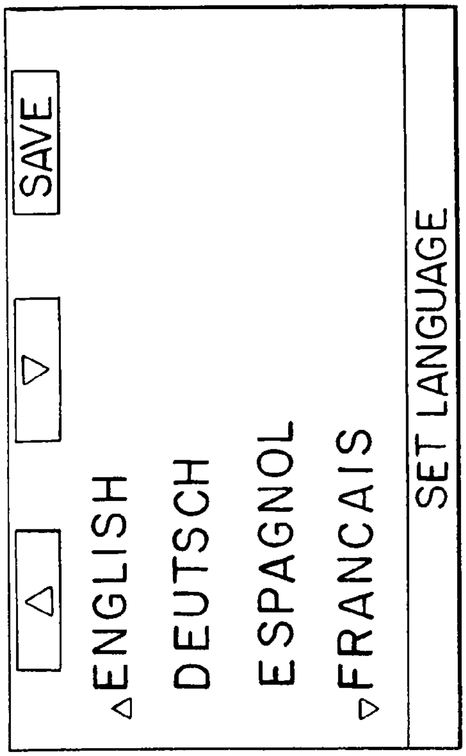
Figure 15:
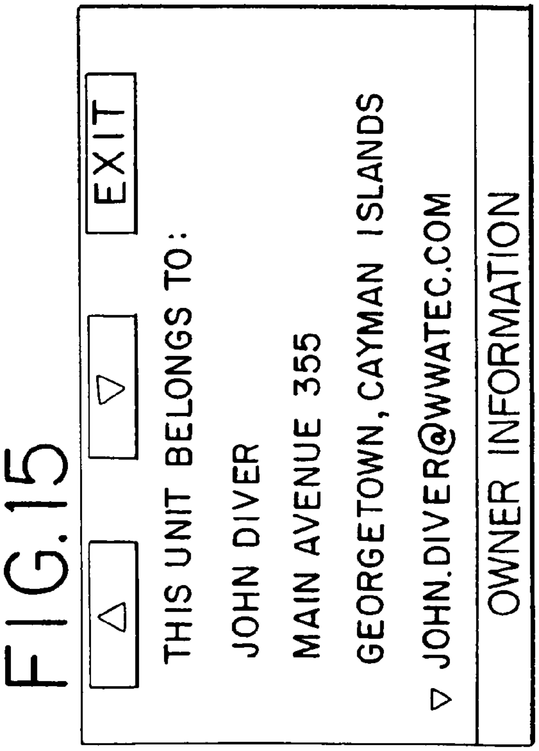
Figure 16:
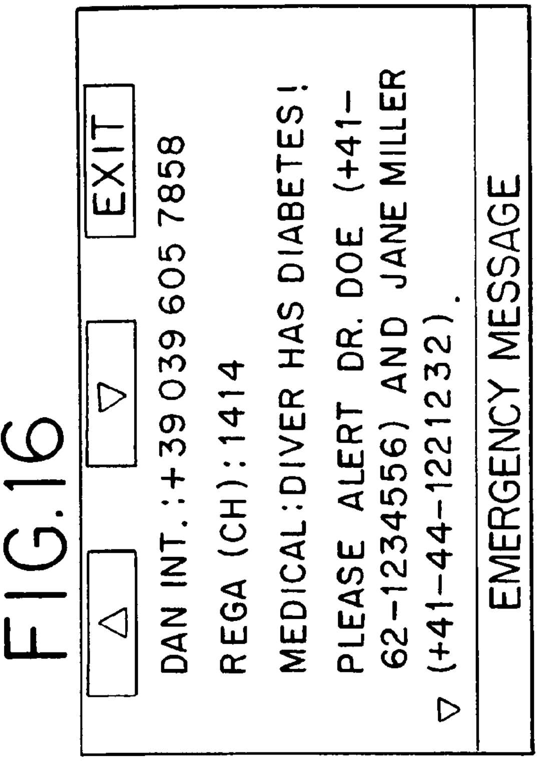

FIG. 13 shows the menu that allows the user to personalize the computer. Here one can choose from a list of preconfigured or self-generated (using the API) screen configurations, set the language used by the computer, select the units to display depth and temperature and more. FIG. 14 depicts a display that allows the user to select a language for displays of information on the diving computer. FIGS. 15-16 depict personal information identifying the owner, the owner's address, emergency contact information, and medical alerts. Access to this information may help others to identify the diver and to assist in cases of emergency.

FIGS. 17-20 depict diving statistics that may be useful to a diver in retrieving information concerning recent dives. These screens are typically reviewed by using the log or logbook functions discussed above. The parameters are automatically saved by the diving computer when a dive is longer than a predetermined period of time, e.g., two minutes. The timing period may be started manually by pressing a control button, or it may be started automatically when the computer senses a depth of 0.9 m/3 ft or deeper.

Figure 17:
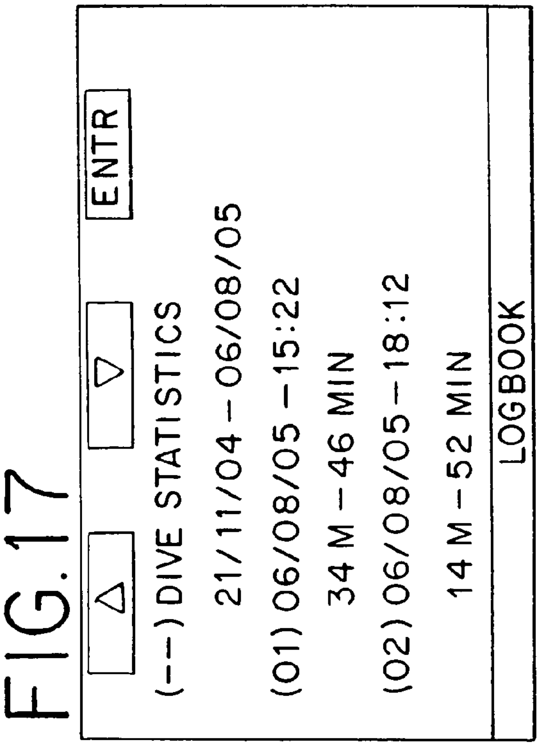
FIGS. 17-18 display dive parameters that were recorded by the diving computer during a dive (logbook function)
Figure 18:
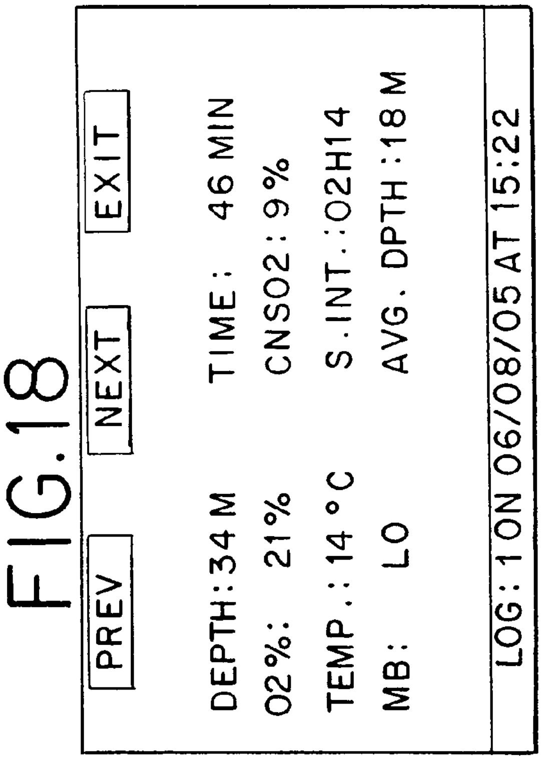
Figure 19:
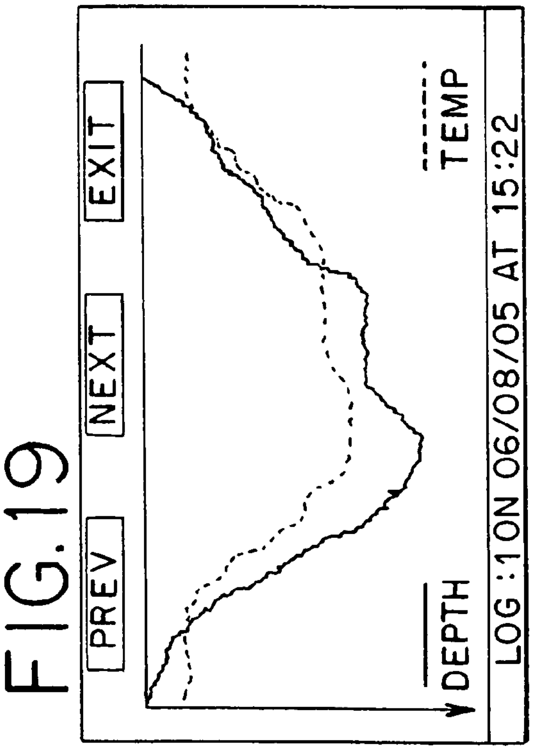
FIGS. 19-20 display graphical views of dive parameters that were recorded by the diving computer.
Figure 20:
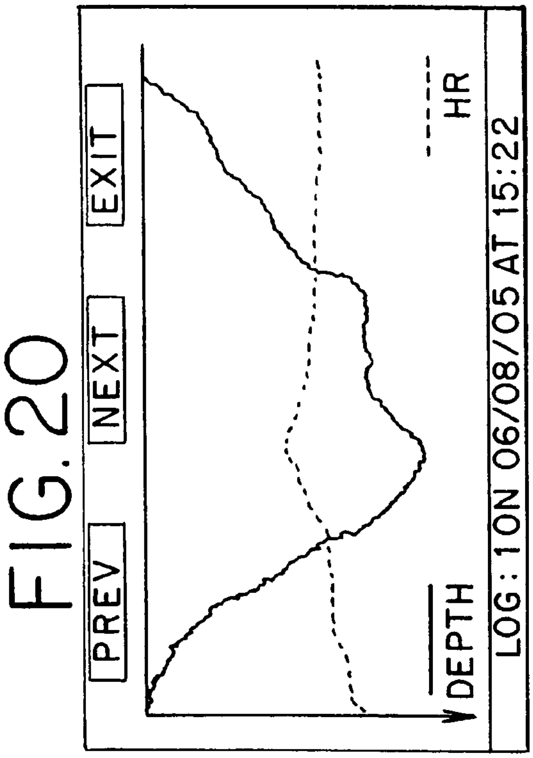

FIG. 17 depicts a two-line summary of each dive. The first dive is highlighted, and shows the date and time of the dive, a maximum depth of the dive, and bottom time for the dive. If the enter button is pressed, additional information about the dive may be displayed. FIG. 18 depicts a first page of additional information about the dive highlighted in FIG. 17. FIG. 19 displays a second page of additional information, with the depth profile in solid line, and the temperature profile in dashed line. FIG. 20 displays a third page of additional information, with the diving profile displaying the depth in solid line and the heart rate of the diver, in dashed line.

Diving computer embodiments according to the present invention are most useful when the digital computer and its memory are easily accessible. As discussed above, the diving computer may have one or more links or interfaces to other, outside computers for reprogramming or updating. Accordingly, the diving computer is preferably protected from harmful outside influences during any such reprogramming or updating intervals. The diving computer may be protected by requiring passwords, by using encryption, by other security methods, or by any combination of two or more security methods. For instance, the diving computer may require a user-provided password when setting diving parameters. A password may be required when connecting the diving computer to an external computer for programming or re-programming the information or the displays of the diving computer. Other security methods may also be used to program and operate the diving computer, with emergency modes and recording of occurrences of the emergency modes used.

In a further embodiment of the dive computer, the user may upload, via the PC interface software described above, digital information. Such digital information may include, but is not limited to, images or fish ID libraries, text (e.g. digital books, blogs, news articles, etc.), podcasts, video games, brain teasers (e.g. Sudoku, etc.), and/or etc. to the dive computer, so that the dive computer can show the digital information on the display at a later time. This is enabled during the dive, for example when the diver wants to identify a fish or during a decompression stop to help the user pass the time, as well as on the surface. During the dive the image displayed would have a time-out time after which the diving information is displayed again. In case of a change in depth of more than a determined amount, the image would be replaced by the diving information immediately. The same holds true in case any of the alarms was to go off.

Along the same lines, all functions of common PDAs (whether Palm based or Windows CE based) such as organizers, address book managers and the likes, can be replicated on a dive computer equipped with a DOT matrix display and the appropriate software to interface with a PC.

Figure 21:
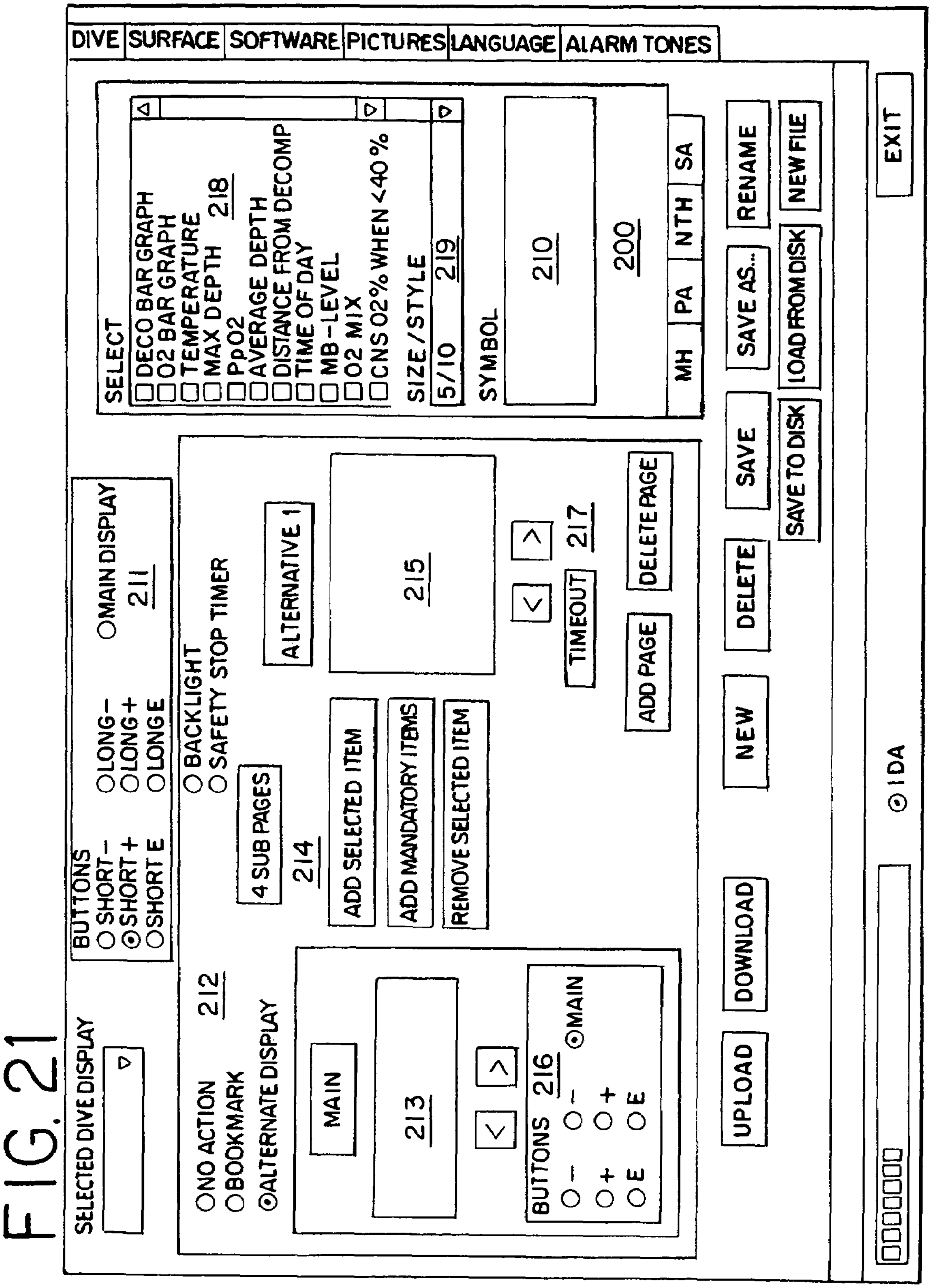
FIG. 21 is an application programming interface for programming displays on a diving computer.

FIG. 21 depicts an application programming interface (API) useful in programming diving computer embodiments. This API 200 includes a number of areas or displays, 210-219, by which the user may program desired features or functions into the diving computer. The user may select one of the four groups (MH, PA, NTH, and SA) using the symbol portion 210 and for each of the desired groups, may then select and program in the desired display 218 and select the desired size or style 219. The user may select a "code" for communicating with the dive computer via the radio buttons in portion 211 of the API. The user may also program in a main display in API area 213. API area 212 may be used to select additional desired features for the diver, such as an alternate display and features for the alternate display in API area 215. An alternate code may be entered using buttons 216. Additional items may be added or removed using the add or remove features in area 214. Options such as a display or alarm timeout may be selected and adjusted using area 217. Other features and displays, as outlined in the discussion above, may also be programmed into the main or alternate displays.

In addition to the API discussed in above, the diving computer is preferably programmed with a variety of "drag and drop" techniques. The drag and drop technique may be used to easily adjust the size of the displays, as shown in FIG. 22. Using this technique, the user will connect the diving computer to the programming computer, and may use an image of the diving computer 10 to select, size and place the selected displays for later viewing when the diving computer is used. In this example, a main depth display 221 is given the largest area and the most prominent location, the upper left. The dive time display 223 is made a little smaller and is also prominently displayed. A display graph 222 for nitrogen is made thin and small and sandwiched into the right margin. Two other displays, 224, 225 for the important dive parameters of decompression stop time and depth, and the ascend time, complete the display.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out the invention. Variations of those preferred embodiments may become apparent to those of ordinary skill in the art upon reading the foregoing description. Skilled artisans will use such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A diving computer, comprising:

a waterproof housing;

a digital computer with a memory mounted inside the housing;

an interface between the digital computer and an external personal computer;

at least one control interface accessible to a user; and a screen connected to the digital computer and visible to the user, wherein at least one of the digital computer and/or the external personal computer is/are configured to reprogrammably customize a size and a selection of at least one item of information displayed on the screen.

2. The diving computer of claim 1, wherein the control interface is configured to allow the user to toggle between a first display of information and a second display of information, wherein the first and second displays of information are for a single operating mode.

3. The diving computer of claim 1, wherein the interface is selected from the group consisting of an infrared link, BLUETOOTH technology, a radiofrequency antenna and a wire connector.

4. The diving computer of claim 1, wherein the information is classified into at least two groups, and wherein all of the information from at least one of the groups must be utilized in the customization of the display and wherein information from another one of the groups may be utilized in the customization of the display.

5. The diving computer of claim 1, wherein the information is classified into necessary information, including must have information and primary alarms and complementary information, including secondary alarms and nice to have information, and wherein all of the necessary information must be utilized in the customization of the display.

6. The diving computer of claim 1, wherein the external personal computer is configured with the diving computer to customize the display of information by at least one technique selected from the group consisting of a selection of the information, a size of the information displayed, and a configuration of the information on the screen.

7. The diving computer of claim 1, wherein the screen is a dot matrix screen.

8. The diving computer of claim 1, wherein the digital computer and the external personal computer are configured to upload digital display information to the digital computer for display on the screen.

9. A diving computer, comprising:

a waterproof housing;

a digital computer with a memory mounted inside the housing, the digital computer or the memory programmed with an algorithm for estimating at least one safety parameter of a dive;

a pressure sensor operably connected to the computer and to the housing for measuring a pressure outside the housing;

an interface between the digital computer and an external personal computer;

at least one control button accessible to a user; and a screen connected to the digital computer and visible to the user, wherein the digital computer and the external personal computer are configured to reprogrammably customize a size and a selection of items of information of a display of information to be displayed on the screen having at least two items of information.

10. The diving computer of claim 9, wherein the screen is a dot matrix screen.

11. The diving computer of claim 9, further comprising an interface computer program residing in the digital computer or the memory, said interface computer program configured for communicating with the external programming interface.

12. The diving computer of claim 9, wherein the digital computer is programmed to revert to a first display of information a fixed period of time after a user has toggled the control button to a second display.

13. The diving computer of claim 9, wherein the digital computer and the external personal computer are configured to upload digital display information to the memory for display on the screen upon selection by a user.

14. A method of displaying information on a diving computer, the method comprising:

providing a diving computer having an interface to an external personal computer, a control interface accessible to a user, and a screen;

reprogrammably customizing a size and a selection of at least one item of information of a display of information to be displayed on the screen, the at least one item of information including at least one diving safety parameter, by programming the digital computer using at least one of the external personal computer and the interface to the external personal computer, and the diving computer;

saving the display of information in the diving computer; and displaying the display of information on the screen.

15. The method of claim 14, further comprising changing the display of information using the control interface by reprogramming the digital computer.

16. The method of claim 14, further comprising selecting a pre-programmed layout of the information of the display of information.

17. The method of claim 14, further comprising the step of uploading digital display information to the diving computer for display on the screen upon selection by a user.

18. The method of claim 17, further comprising the step of replacing the digital information displayed on the screen with the information upon occurrence of an event.

19. The method of claim 17, wherein the step of uploading digital display information to the diving computer for display on the screen upon selection by a user comprises the step of uploading at least one of images, fish ID libraries, text, podcasts, video games, or brain teasers to the diving computer for display on the screen upon selection by a user.

20. The method of claim 14, wherein the step of reprogrammably customizing a size and a selection of at least one item of information of a display of information to be displayed on the screen comprises the step of designing a customized display using an application programming interface residing on the external personal computer.

21. The method of claim 20, wherein the step of designing the customized display of information comprises the step of building a customized display of information by selecting each item of information of the customized display of information.

22. The method of claim 21, wherein the step of building the customized display includes the steps of selecting at least one item of information from at least one listing of items of information provided by the application programming interface and locating the selected at least one item of information on the customized display of information by dragging and dropping the at least one item of information.

23. The method of claim 22, wherein the at least one listing of items of information includes a first listing of items of information providing must have items, and the step of selecting each item of information of the customized display of information includes first selecting must have items from the first listing.

24. The method of claim 23, wherein the at least one listing of items of information includes a second listing of items of information providing complimentary items, and the step of selecting each item of information of the customized display of information further comprises the step of selecting complimentary items after all of the must have items have been selected.

25. The method of claim 20, wherein the step of customizing a size and a selection of at least one item of information of a display of information to be displayed on the screen includes the steps of selecting a pre-programmed layout of information having a predetermined size and selection of information and then adjusting the predetermined size of at least one item of the information of the pre-programmed layout and adjusting the predetermined selection of at least one item of the information of the pre-programmed layout by deleting or adding at least one item of information.

26. The method of claim 14, wherein the step of reprogrammably customizing a size and a selection of at least one item of information of a display of information on the screen comprises the step of manipulating a corner of an item of information to adjust the size thereof.

* * * * *